United States Patent [19]

Farines

[11] 4,447,007
[45] May 8, 1984

[54] SWIVELLING DEVICE FOR SPREADING LIQUIDS BY SPRAYING

[76] Inventor: Jean-Michel Farines, 2 Avenue Fauvelle, 66300 Thuir, France

[21] Appl. No.: 328,573
[22] PCT Filed: Apr. 1, 1981
[86] PCT No.: PCT/FR81/00046
§ 371 Date: Dec. 1, 1981
§ 102(e) Date: Dec. 1, 1981
[87] PCT Pub. No.: WO81/02825
PCT Pub. Date: Oct. 15, 1981

[30] Foreign Application Priority Data

Apr. 4, 1980 [FR] France .............................. 80 07894

[51] Int. Cl.³ .............................................. B05B 1/20
[52] U.S. Cl. .................................................... 239/165
[58] Field of Search ................ 239/165, 169, 176, 77, 239/78, 281; 169/24

[56] References Cited

U.S. PATENT DOCUMENTS 2,608,792  9/1952  Chater et al.
2,613,109  10/1952  Walker .................................. 239/77
3,346,052  10/1967  Moore et al. .................... 239/281 X
3,599,722  8/1971  Davidson et al. ..................... 169/24
3,883,073  5/1975  Ballu ..................................... 239/77
4,170,264  10/1979  Gibson ............................ 239/165 X

FOREIGN PATENT DOCUMENTS 2136494  12/1972  France .
2216797  8/1974  France .

Primary Examiner—John J. Love
Assistant Examiner—Mary McCarthy
Attorney, Agent, or Firm—Karl F. Ross; Herbert Dubno

[57] ABSTRACT

A spraying member mounted on a platform able to be oriented in all directions, both in vertical and horizontal planes. The member may be carried by any moving machine having hydraulic pressure installation and preferably a telescopic hinged arm which allows the spraying member to approach the surface to be sprayed or treated. The spraying member can spray areas above, on, or below the ground level since it is pivoted about three orthogonal axes. The spraying device is appropriate for insecticidal and herbicidal treatments, or for the spreading of fertilizers.

4 Claims, 4 Drawing Figures

SWIVELLING DEVICE FOR SPREADING LIQUIDS BY SPRAYING

CROSS REFERENCE TO RELATED APPLICATION

This application is a national phase application corresponding to PCT/FR81/00046 filed Apr. 1, 1981 and based upon French application No. 80 07894 filed Apr. 4, 1980 under the International Convention.

FIELD OF THE INVENTION

This invention relates to devices for the application of atomized liquid products for the treatment of plants, such as insecticides, fungicides or any other treatment such as antipollution treatments.

BACKGROUND OF THE INVENTION

Known treatment devices which can apply atomized liquid products are generally devices which are specially designed for the particular treatments under consideration. Among other things, the quality of atomization which they can produce depends on the nature of the product to be spread. Thus, for fungicidal products, the atomization required must be fine so that the products may penetrate deeply to the inside of the plants to be treated, which requires a high pressure on the atomized liquid and a high air velocity in order to further dissociate the droplets thus formed. On the other hand, for the spreading of herbicides or even of liquid fertilizers, the atomization must be coarse so that the products will not be carried beyond the zone to be treated.

Similarly, the specialization of these devices adapted to specific treatments has resulted in the imparting to each of those of a structure specially adapted to the nature of the plants to be treated. Thus, the known devices designed, for example, for fungicidal treatments are generally devices which can circulate within the rows of the plants to be treated, the spraying devices thereof being located at the most convenient height as a function of the height of said plants, trees or shrubs.

On the other hand, known devices for herbicidal treatments comprise spraying devices which are placed near the ground and which generally have a long ramp located perpendicularly with respect to the direction of forward motion of the device.

Such devices, because of the nature of the spray which they produce, and because of the nature of the spreading members which they comprise and their fixed location with respect to the ground, are not adaptable to the various treatment conditions and they are particularly not suited for treatments of high forests or of hedges and even less of channels.

OBJECT OF THE INVENTION

The object of this invention is to overcome this drawback.

SUMMARY OF THE INVENTION

The treatment device of the invention is designed so that it can spray at various pressures, so that the atomization characteristics may be adapted to the nature of the product which is spread. For this purpose, a blowing device for air, the velocity of which may vary and even be nil, is associated means for the mechanical atomization of the liquid so as to provide, if necessary, a perfect localization of the treatment, this result being obtained through the use of working members which are provided with velocity or flow rate varying devices. Indeed, the blower is driven by a variable speed hydraulic motor and the liquid spraying circuit comprises a discharge device of the known "by-pass" type, which, as a result of the simultaneous reciprocal interplay of its adjustment possibilities, provides a perfect adaptation of operating conditions.

But, above all, the treatment member is made movable in the three planes of space so that it can be oriented in all directions and it is mounted on a movable device comprising a swivelling telescopic lifting arm which makes it possible to bring the treatment unit as near as necessary to the plant surface to be treated whatever its level may be with respect to the ground and even if the treatment to be carried out is below the ground surface.

For this purpose, the treatment member, which comprises the liquid spraying device and the air blower are supported by a platform located at the extremity of long articulated movable arms driven by hydraulic jacks, said platform being itself movable with respect to the arm supporting it along the three orthogonal axes of space.

Such an arrangement makes it possible, therefore, to bring the spraying member, when necessary, as near as possible to the zone to be treated, whether the latter is located at a very high level or, on the contrary, below ground level or whether it is located in the horizontal or vertical plane.

BRIEF DESCRIPTION OF DRAWING

The appended drawing, given only by way of example, illustrate one embodiment of the spray device of this invention.

SPECIFIC DESCRIPTION

Figure 1:
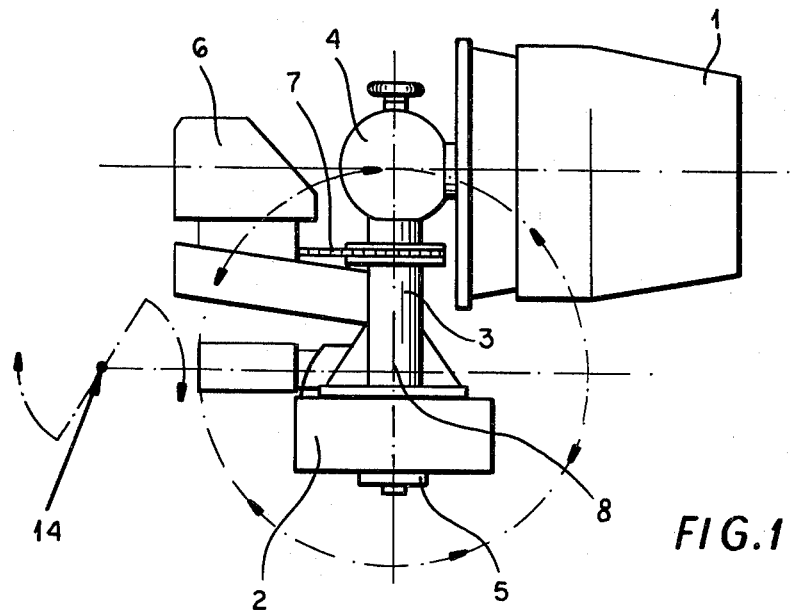
FIG. 1 is a schematic side elevational view of the object of this invention.

As shown, the device of this invention comprises a spray mixing device 1 (FIG. 1) consisting, in a manner already known, of an annular ramp of spraying jets under pressure, not shown, or of a micronization turbine, placed at the mouth of a ventilation tunnel on the inside of which an air stream can be blown in by means of a helicoidal turbine located at the inlet of said tunnel.

According to this invention, the helicoidal turbine and the pump which puts the liquid under pressure (when spraying takes place through jets), are each driven by a hydraulic motor, the flow rate of said pump being controlled by a parallel discharge circuit. The speed of the turbine can vary depending on the quality of the operation to be carried out and on the range desired. It can even be stopped when the operation requires the elimination of all extraneous mist.

The spraying member 1 is supported by a platform 2, the plane of which is parallel to the axis of said member, by means of turret 3 perpendicular to the plane of platform 2. The turbine located in tunnel 1 can be driven either by a motor device located in head 4 of turret 3, or by a motor device 5 driven hydraulically located beneath platform 2 and whose driving axis, which crosses turret 3, sets the turbine in motion by means of a bevel gear located in head 4.

Spraying member 1 thus mounted on turret 3 can oscillate on either side of its median position in a plane parallel to platform 2, around the axis of said turret, and is driven into this oscillating motion by the hydraulic device 6 which controls the turret 3 by means of a chain 7 or of any other known coupling. This oscillating motion can, if necessary, be maintained in accordance with a specific and variable frequency.

Figure 2:
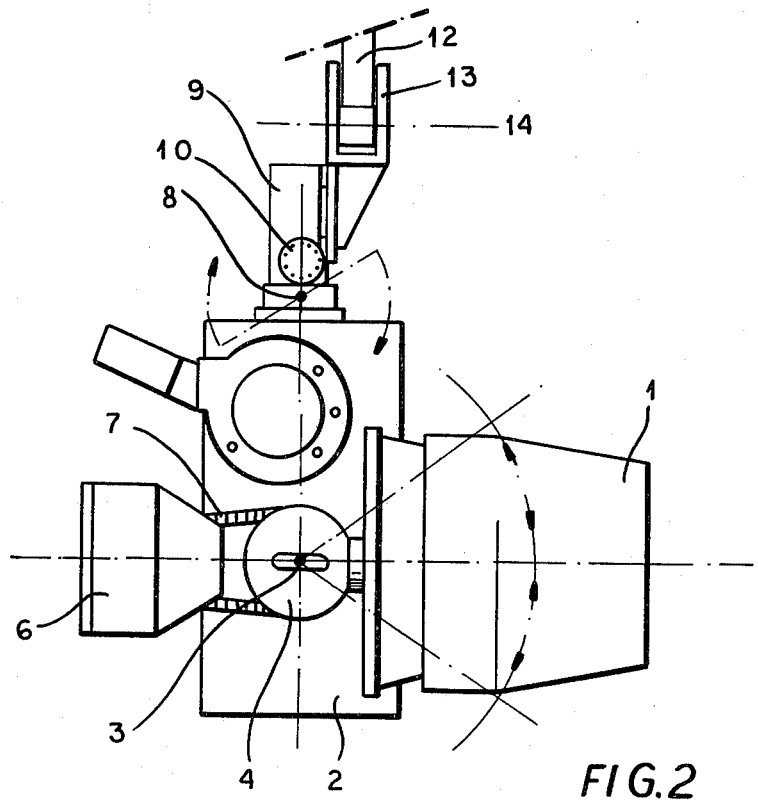
FIG. 2 is a schematic plan view of the same object.

Platform 2 can itself pivot over 360° around axis 8 parallel to its plane and contained in the orthogonal plane passing through its longitudinal median line, said axis being supported by axle 9 which is driven into rotation by means of a jack or of an assembly of jacks 10 which function as double-acting cylinders controlling a rack which is in meshing engagement with said axis of rotation (FIG. 2).

Figure 3:
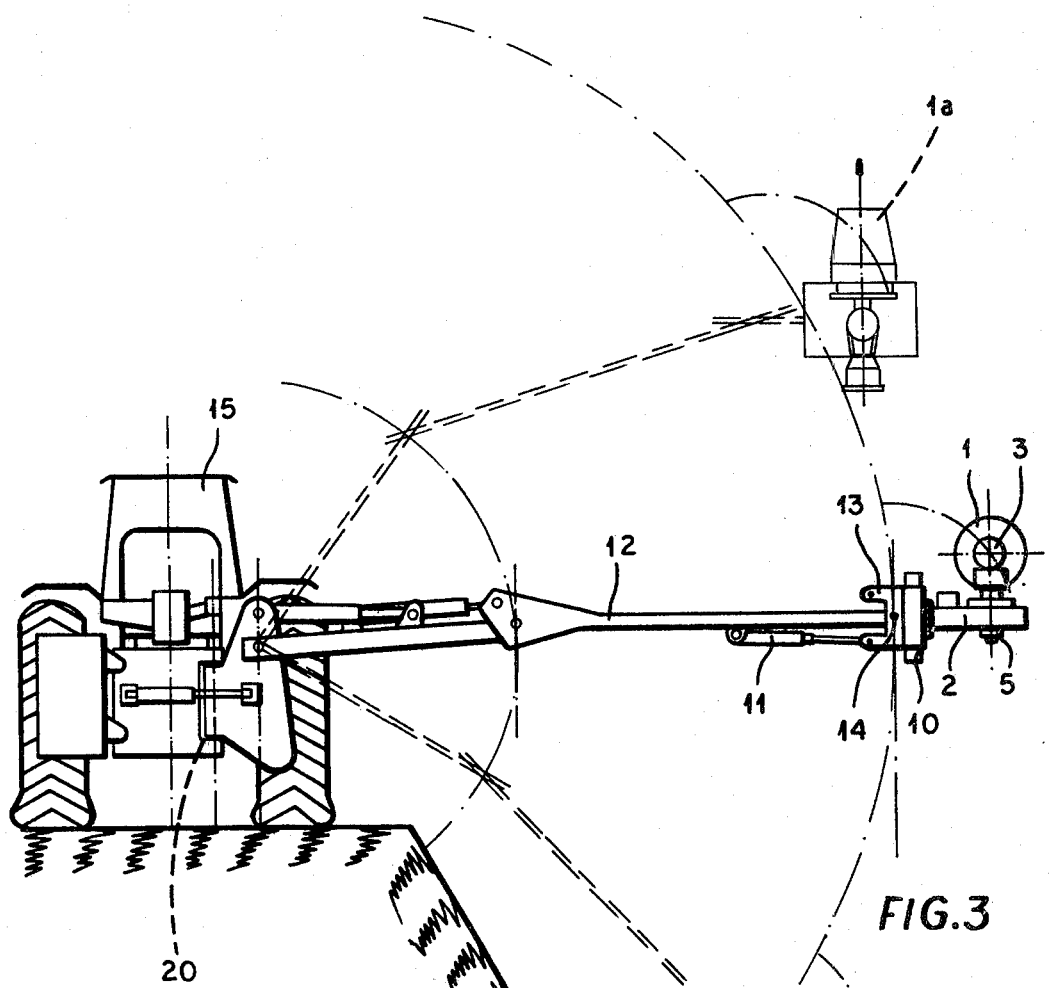
FIG. 3 is a schematic view of the object of this invention shown in use and supported by a movable device at the extremity of an articulated telescopic arm.
Figure 4:
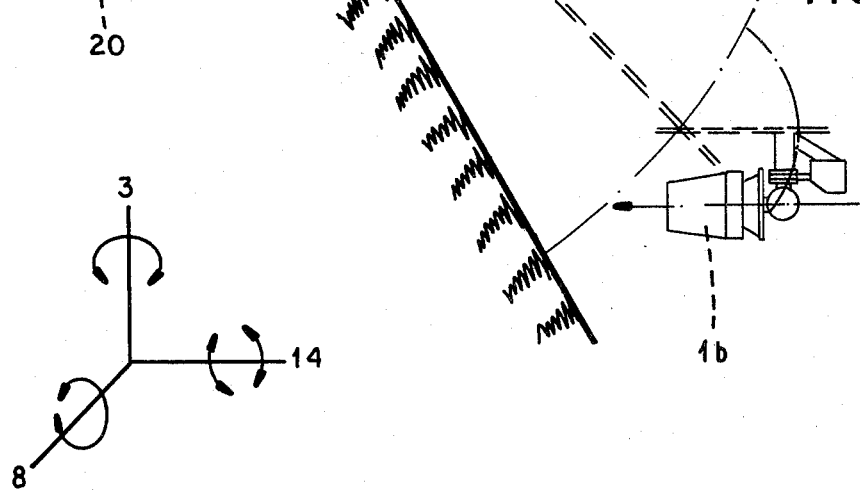
FIG. 4 is a stereoscopic view of the three axes along which the spraying member can be moved.

Finally, the platform 2 can move in the vertical plane on either side of the horizontal plane in which an effort is made to maintain it, using the double-acting jack 11 (FIG. 3) which bears against arm 12 which supports the entire assembly and which has its point of application on either side of this arm 12 on flange 13 of a support member on the axis 14 of which is perpendicular to the plane formed by above-mentioned axes 3 and 8 (this orientation in the vertical plane of platform 2 could also be obtained by means of a double effect rack jack of the same type as jack 10).

It can therefore be seen, that due to the combined or independent action of each of the possible movements around orthogonal axes 3, 8 and 14, it is possible to impart any orientation in space to spraying member 1.

In addition, since it is mounted on the articulated and telescopic arms 12 of the movable device 15, the spraying member 1 can be placed, as shown in FIG. 1, at a variable height with respect to the ground. This height can have a very large value (position 1a—FIG. 3), an arrangement in which arms 12 are completely extended (full-line showing) or, on the contrary, it can have a value which places said member below ground level (position 1b—FIG. 3), whenever the operation requires any of these positions indicated by dashes in FIG. 3.

With the device thus set up, it is seen that, due to the multiple and various orientations, as well as to the extreme heights at which the device can be placed and finally due to the possibilities of varying the pressure on the liquid and of varying the speed on the ventilation turbine, it is possible to use such a device for the most varied operations in a manner which is perfectly adapted to the various products used and to the different results desired.

Indeed, because of this extreme capacity of adaptation thus acquired, it is possible to effect large volume and long range insecticidal or fungicidal treatments from a level below ground level up to the top of the highest trees thus providing for the treatment of forests or the elimination of mosquitoes from lagoons and channels.

On the other hand, with regard to the cleaning of fields or defoliation, which require the elimination of all mist, it is possible to bring the spraying member to a maximum closeness to the plane to be treated and to eliminate ventilation while decreasing the spraying pressure so as to reach only the particular treatment zone while sparing the neighboring zones. It is thus possible to treat channels so as to cleanse them, slopes so as to clean them, hedges or woods so as to defoliate them without any hazards to the neighboring areas.

It is of course understood that the scope of the invention is not limited to the example or examples of embodiments thereof which have been described, any variation considered as equivalent resulting in no modification whatsoever of its scope.

The device of the invention can be used for all agricultural operations or public works which can be carried out by means of spraying of liquid chemicals, examples thereof which have been given being in no way limiting, the swivelling treatment assembly thus constituted being carried by an movable device provided with a hydraulic pump and a hydraulic distributor. This device which makes the treatment member movable in all directions of space can also be used, possibly, for the spreading of powders.

I claim:

1. A device for spraying a liquid which comprises in combination:
    a vehicle adapted to travel along a site to be sprayed;
    an arm articulated to said vehicle and provided with means enabling a free end of said arm to be moved to a location below said vehicle, to a location above the level of said vehicle and to selective locations between said locations above and below said vehicle;
    a support member pivotally connected with said arm for rotation relative thereto about a substantially horizontal first axis, said arm and said member being interconnected by means for rotating said member about said first axis;
    a platform journalled on said member for rotation relative thereto about a substantially horizontal second axis orthogonal to said first axis; and
    an atomizing head mounted on said platform for angular displacement thereof about a third axis substantially orthogonal to said first and second axes, said head being provided with means for dispensing an atomized spray of said liquid in a pattern having a further axis substantially orthogonal to said third axis.

2. The device defined in claim 1 wherein said head is swingable about said third axis to opposite sides of a median position by means of a hydraulic motor connected to the head by a chain rotating about said third axis.

3. The device defined in claim 1, further comprising means for rotating said platform about said second axis, said means including a double-acting hydraulic jack having a rack meshing with teeth carried by said platform.

4. The device defined in claim 1 wherein said means for rotating said member about said first axis includes a double-acting hydraulic jack pivotally connected to said arm and to said member.

* * * * *